United States Patent
Wan et al.

(10) Patent No.: US 10,860,877 B2
(45) Date of Patent: Dec. 8, 2020

(54) LOGISTICS PARCEL PICTURE PROCESSING METHOD, DEVICE AND SYSTEM

(71) Applicant: Hangzhou Hikvision Digital Technology Co., Ltd., Zhejiang (CN)

(72) Inventors: Qiming Wan, Zhejiang (CN); Xing Shi, Zhejiang (CN); Mingling Zhu, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 189 days.

(21) Appl. No.: 16/321,959

(22) PCT Filed: May 31, 2017

(86) PCT No.: PCT/CN2017/086598
§ 371 (c)(1),
(2) Date: Jan. 30, 2019

(87) PCT Pub. No.: WO2018/024024
PCT Pub. Date: Feb. 8, 2018

(65) Prior Publication Data
US 2019/0164001 A1 May 30, 2019

(30) Foreign Application Priority Data
Aug. 1, 2016 (CN) .......................... 2016 1 0615067

(51) Int. Cl.
*G06K 7/10* (2006.01)
*G06K 7/14* (2006.01)
*G06K 9/32* (2006.01)
*G06K 9/62* (2006.01)
(Continued)

(52) U.S. Cl.
CPC ......... *G06K 9/3233* (2013.01); *G06F 9/4881* (2013.01); *G06K 7/10861* (2013.01);
(Continued)

(58) Field of Classification Search
CPC .............. G06F 9/4881; G06K 7/10861; G06K 7/1443; G06K 7/1465; G06K 9/3233;
(Continued)

(56) References Cited

U.S. PATENT DOCUMENTS 6,590,999 B1 * 7/2003 Comaniciu .............. G06K 9/32
348/416.1
7,274,819 B2 * 9/2007 Matsugu ............ G06K 9/00281
382/181
(Continued)

FOREIGN PATENT DOCUMENTS

CN 101281597 A 10/2008
CN 103020759 A 4/2013
(Continued)

OTHER PUBLICATIONS

Vlad-Gaudin et al. ("A bar code location algorithm using a two-dimensional approach," Proceedings of 2nd International Conference on Document Analysis and Recognition, Oct. 20-22, 1993) (Year: 1993).*

*Primary Examiner* — Yubin Hung
(74) *Attorney, Agent, or Firm* — Bret E. Field; Bozicevic, Field & Francis LLP (57) ABSTRACT

The embodiments of the present application provide a method, apparatus and system for processing an image of a logistics parcel, which can capture an image with a barcode in a proper position. The method comprises: identifying a barcode in a Nth image to acquire position of the barcode in the Nth image, and placing the position into a queue; predicting a position that the barcode would locate in a (N+1)th image to be captured; identifying a barcode in the (N+1)th image to acquire position of the barcode relative to the (N+1)th image; determining whether the position of the barcode in the (N+1)th image matches with the predicted position; if so, placing the information of the barcode in the
(Continued)

(N+1)th image into the queue; and after the parcel leaves the field of view, selecting, according to a preset optimal position of the barcode in an image and the information of the barcode placed into the queue, an optimal image from all images captured for the parcel. The present application is adapted to acquire logistic parcel information.

20 Claims, 5 Drawing Sheets

(51) Int. Cl.
    *G06K 19/06*     (2006.01)
    *G06F 9/48*     (2006.01)
    *G06Q 10/08*     (2012.01)

(52) U.S. Cl.
    CPC ......... *G06K 7/1443* (2013.01); *G06K 7/1465* (2013.01); *G06K 9/6201* (2013.01); *G06K 19/06028* (2013.01); *G06Q 10/0833* (2013.01); *G06K 2009/6213* (2013.01)

(58) Field of Classification Search
    CPC ........... G06K 9/6201; G06K 19/06028; G06K 2009/6213; G06Q 10/0833
    See application file for complete search history.

(56) References Cited

U.S. PATENT DOCUMENTS

| | | | |
|---|---|---|---|
| 2003/0053715 A1* | 3/2003 | Chamberlain | G06K 7/10732 382/294 |
| 2003/0086596 A1* | 5/2003 | Hipp | G06T 7/0012 382/128 |
| 2003/0118245 A1* | 6/2003 | Yaroslavsky | G06T 7/0002 382/255 |
| 2013/0112750 A1 | 5/2013 | Negro et al. | |
| 2013/0175340 A1 | 7/2013 | Endo et al. | |
| 2016/0019700 A1* | 1/2016 | Maggio | G06T 7/20 382/103 |
| 2016/0104021 A1 | 4/2016 | Negro et al. | |
| 2016/0239712 A1* | 8/2016 | Kitano | G06K 9/00187 |
| 2018/0165548 A1* | 6/2018 | Wang | G06N 3/0454 |

FOREIGN PATENT DOCUMENTS

| | | |
|---|---|---|
| CN | 103413156 A | 11/2013 |
| CN | 104966043 A | 10/2015 |
| EP | 0851376 A1 | 7/1998 |
| GB | 2138982 A | 10/1984 |

\* cited by examiner

| a | b | c | d | 1 | 2 | 3 | 4 | 5 | 6 |
|---|---|---|---|---|---|---|---|---|---|
| a | h | c | x | 0 | 2 | 3 | 4 | 5 | 6 |
| f | b | k | d | 1 | 8 | 3 | 4 | 4 | 6 |
| a | b | c | d | 1 | 2 | 3 | 2 | 5 | 6 |
| g | j | c | x | 1 | 2 | 0 | 4 | 5 | 6 |
| a | b | c | d | 9 | 2 | 3 | 4 | 5 | 1 |
| a | b | c | d | 1 | 2 | 3 | 4 | 5 | 6 |

LOGISTICS PARCEL PICTURE PROCESSING METHOD, DEVICE AND SYSTEM

The present application claims the priority to a Chinese Patent Application No. 201610615067.5, filed with the China National Intellectual Property Administration on Aug. 1, 2016 and entitled "LOGISTICS PARCEL IMAGE PROCESSING METHOD, DEVICE AND SYSTEM", which is incorporated herein by reference in its entirety.

TECHNICAL FIELD

The present application relates to the field of image processing technology, and in particular, to a method, apparatus and system for processing an image of a logistics parcel.

BACKGROUND

Logistics parcel information is typically acquired by identifying a code on the surface of a logistics parcel. The code may be a one-dimensional code (also known as a barcode) or a two-dimensional code (also known as a two-dimensional barcode). A barcode is a graphic identifier that conveys information through the arrangement of a plurality of black bars and blanks of different widths according to a certain coding rule. A common barcode is a pattern that includes parallel rows of black bars (abbreviated as bars) and white bars (abbreviated as blanks). The black bars have a quite different reflectivity from the white bars. A two-dimensional code is a black and white pattern, in which geometries are subject to a somewhat regular planar (two-dimensional) distribution. Information regarding a text, image, audio or video can be encoded into a two-dimensional code and then be presented by a specific software as being shot by a camera.

In relevant art, typically, a barcode on the surface of a logistics parcel is directly identified when being exposed to a barcode scanner. Alternatively, a camera may be first used to obtain an image of the surface of the parcel such that a barcode area in the image is determined, and then the barcode in the area can be identified.

In the implementation of the present application, applicant notes that, the existing methods for processing an image of a logistics parcel can only be used to identify a barcode, but are not able to capture an image with a barcode in a proper position. Such an image, however, may find great applications in logistics parcel information preservation and provision of logistics evidence.

SUMMARY

In view of above, embodiments of the present application provide a method, apparatus and system for processing an image of a logistics parcel, so as to capture an image with a barcode in a proper position.

In a first aspect, an embodiment of the present application provides a method for processing an image of a logistics parcel. The method includes the following operations:

capturing a Nth image of a parcel moving in a field of view; where N is a natural number;

identifying a barcode in the Nth image to acquire information of the barcode, and placing the information of the barcode into a queue; wherein the information of the barcode includes a position of the barcode relative to the Nth image;

predicting a position that the barcode in the Nth image would locate in a (N+1)th image to be captured;

capturing the (N+1)th image of the parcel;

identifying a barcode in the (N+1)th image to acquire information of the barcode in the (N+1)th image; wherein the information of the barcode in the (N+1)th image includes a position of the barcode relative to the (N+1)th image;

determining whether the position of the barcode in the (N+1)th image relative to the (N+1)th image matches with the predicted position;

if so, placing the information of the barcode in the (N+1)th image into the queue; and after the parcel leaves the field of view, selecting, according to a preset optimal position of the barcode in an image and the information of the barcode placed into the queue, an optimal image from all images captured for the parcel.

In conjunction with the first aspect, in a first implementation of the first aspect, a position of a barcode in an image relative to the image includes: a position of a vertex of a polygon that circumscribes the barcode in the image.

In conjunction with the first aspect, in a second implementation of the first aspect, determining whether the position of the barcode in the (N+1)th image relative to the (N+1)th image matches with the predicted position includes:

determining whether a distance between a center of the position of the barcode in the (N+1)th image relative to the (N+1)th image and a center of the predicted position of the barcode satisfies a predetermined threshold requirement; and if so, determining that the position of the barcode in the (N+1)th image relative to the (N+1)th image matches with the predicted position.

In conjunction with the first aspect or the first implementation of the first aspect, in a third implementation of the first aspect, after the parcel leaves the field of view, selecting, according to a preset optimal position of the barcode relative to an image and the information of the barcode placed into the queue, an optimal image from all images captured for the parcel includes:

determining, after the parcel leaves the field of view, a center of the barcode in each captured image according to the information of the barcode placed in the queue;

selecting, from all captured images, an image the center of which is closest to the center of the barcode as the optimal image; or selecting, from all captured images, an image in which the center of the barcode is closest to a center of a preset area as the optimal image.

In conjunction with the third implementation of the first aspect, in a fourth implementation of the first aspect, the method for processing an image of a logistics parcel further includes: outputting the optimal image as selected.

In conjunction with the first aspect and any implementation in the four implementations of the first aspect, in a fifth implementation of the first aspect, information of a barcode further includes an identification result for the barcode;

the method further includes:

after the parcel leaves the field of view, classifying identification results for a barcode in all captured images into categories in terms of the number of characters contained in each of the identification results;

selecting, from the categories, a category that has the largest number of members; and for the selected category, analyzing each of the identification results for the barcode bit by bit, and taking a character that appears with the highest frequency in each bit as an identification result for the bit, so as to obtain a final identification result for the barcode.

In conjunction with the five implementation of the first aspect, in a sixth implementation of the first aspect, the method further includes: superimposing the final identification result for the barcode on the optimal image as selected.

In conjunction with the first aspect, in a seventh implementation of the first aspect, if the position of the barcode in the (N+1)th image relative to the (N+1)th image does not match with the predicted position, the information of the barcode in the (N+1)th image into another queue.

In conjunction with the first aspect, in an eighth implementation of the first aspect, identifying a barcode in the Nth image to acquire information of the barcode and placing the information of the barcode into a queue includes:

identifying a plurality of barcodes in the Nth image to acquire information of the barcodes, and placing the information of each of the barcodes into a separate queue; wherein the information of each of the barcodes includes a position of the barcode in the Nth image.

In conjunction with the eighth implementation of the first aspect, in a ninth implementation of the first aspect, determining whether the position of the barcode in the (N+1)th image relative to the (N+1)th image matches with the predicted position, and if so, placing the information of the barcode in the (N+1)th image into the queue includes:

determining, for each barcode in the (N+1)th image, whether a distance between a center of the position of the barcode in the (N+1)th image relative to the (N+1)th image and a center of the predicted position that the barcode would locate in the (N+1)th image satisfies a predetermined threshold requirement; if so, determining that the position of the barcode in the (N+1)th image relative to the (N+1)th image matches with the predicted position that the barcode would locate in the (N+1)th image as captured; and placing the information of each barcode whose position relative to the (N+1)th image matches with the predicted position into a separate queue.

In conjunction with the eighth implementation of the first aspect, in a tenth implementation of the first aspect, after the parcel leaves the field of view, selecting, according to a preset optimal position of the barcode relative to an image and the information of the barcode placed into the queue, an optimal image from all images captured for the parcel includes:

for each captured image, acquiring, after the parcel leaves the field of view, a position of each barcode relative to the image from a plurality of queues respectively, and determining a common center for the plurality of barcodes in the image;

selecting, from all the captured images, an image in which the common center for the plurality of barcodes is closest to the center of the image as the optimal image; or selecting, from all the captured images, an image in which the common center for the plurality of barcodes is closest to the center of a preset area as the optimal image.

In a second aspect, an embodiment of the present application provides an apparatus for processing an image of a logistics parcel. The apparatus includes:

a first capturing module, configured for capturing a Nth image of a parcel moving in a field of view; where N is a natural number;

a first identification module, configured for identifying a barcode in the Nth image to acquire information of the barcode, and placing the information of the barcode into a queue; wherein the information of the barcode includes a position of the barcode relative to the Nth image;

a prediction module, configured for predicting a position that the barcode in the Nth image would locate in a (N+1)th image to be captured;

a second capturing module, configured for capturing the (N+1)th image of the parcel;

a second identification module, configured for identifying a barcode in the (N+1)th image to acquire information of the barcode in the (N+1)th image; wherein the information of the barcode in the (N+1)th image includes a position of the barcode relative to the (N+1)th image;

a matching module, configured for determining whether the position of the barcode in the (N+1)th image relative to the (N+1)th image matches with the predicted position in the (N+1)th image, and if so, placing the information of the barcode in the (N+1)th image into the queue;

a selecting module, configured for selecting, after the parcel leaves the field of view, an optimal image from all the images captured for the parcel according to a preset optimal position of the barcode in an image and the information of the barcode placed into the queue.

In conjunction with the second aspect, in a first implementation of the second aspect, a position of a barcode in an image relative to the image includes: a position of a vertex of a polygon that circumscribes the barcode in the image.

In conjunction with the second aspect, in a second implementation of the second aspect, the matching module includes:

a first determining sub-module, configured for determining a center of the barcode in the (N+1)th image, and a predicted center of the barcode;

a decision sub-module, configured for determining whether a distance between a center of the position of the barcode in the (N+1)th image relative to the (N+1)th image and a center of the predicted position of the barcode satisfies a predetermined threshold requirement; and if so, determining that the position of the barcode in the (N+1)th image relative to the (N+1)th image matches with the predicted position.

In conjunction with the second aspect or the first implementation of the second aspect, in a third implementation of the second aspect, the selecting module includes:

a second determining sub-module, configured for determining, after the parcel leaves the field of view, a center of the barcode in each image as captured according to the information of the barcode placed in the queue;

a selecting sub-module, configured for selecting, from all the captured images, an image the center of which is closest to the center of the barcode as the optimal image; or selecting, from all the captured images, an image in which the center of the barcode is closest to a center of a preset area as the optimal image.

In conjunction with the second aspect, in a fourth implementation of the second aspect, the apparatus further includes: an image output module, configured for outputting the optimal image selected by the selecting module.

In conjunction with the second aspect and any implementation in the four implementations of the second aspect, in a fifth implementation of the second aspect, information of a barcode further includes an identification result for the barcode;

the apparatus further includes:

a character fusion module, configured for classifying, after the parcel leaves the field of view, identification results for a barcode in all captured images into categories in terms of the number of characters contained in each of the identification results; selecting, from the categories, a category that has the largest number of members; and for the selected category, analyzing each of the identification results for the barcode bit by bit, and taking a character that appears with the highest frequency in each bit as an identification result for the bit, so as to obtain a final identification result for the barcode.

In conjunction with the five implementation of the second aspect, in a sixth implementation of the second aspect, the apparatus further includes a superimposing module, configured for superimposing the final identification result for the barcode on the optimal image as selected.

In conjunction with the second aspect, in a seventh implementation of the second aspect, the matching module is further configured for placing, if the position of the barcode in the (N+1)th image relative to the (N+1)th image does not match with the predicted position, the information of the barcode in the (N+1)th image to another queue.

In conjunction with the second aspect, in an eighth implementation of the second aspect, the first identification module is further configured for identifying a plurality of barcodes in the Nth image to acquire information of the barcodes, and placing the information of each of the barcodes into a separate queue; wherein the information of each of the barcodes includes a position of the barcode in the Nth image.

In conjunction with the eighth implementation of the second aspect, in a ninth implementation of the second aspect, the matching module is further configured for determining, for each barcode in the (N+1)th image, whether a distance between a center of the position of the barcode in the (N+1)th image relative to the (N+1)th image and a center of the predicted position that the barcode would locate in the (N+1)th image satisfies a predetermined threshold requirement; and if so, determining that the position of the barcode in the (N+1)th image relative to the (N+1)th image matches with the predicted position that the barcode would locate in the (N+1)th image as captured, and placing the information of each barcode whose position relative to the (N+1)th image matches with the predicted position to a separate queue.

In conjunction with the eighth implementation of the second aspect, in a tenth implementation of the second aspect, the selecting module is configured for: for each captured image, acquiring, after the parcel leaves the field of view, a position of each barcode relative to the image from a plurality of queues respectively, and determining a common center for the plurality of barcodes in the image; selecting, from all the captured images, an image in which the common center for the plurality of barcodes is closest to the center of the image as the optimal image; or selecting, from all the captured images, an image in which the common center for the plurality of barcodes is closest to the center of a preset area as the optimal image.

In a third aspect, an embodiment of the present application provides a system for processing an image of a logistics parcel, including:

a conveyor and an apparatus for processing an image of a logistics parcel as described in any of the embodiments above, wherein, the conveyor is used to convey a parcel;

the apparatus is configured to capture an image of a parcel placed on the conveyor as the parcel enter a field of view, and process the image as captured.

In a fourth aspect, an embodiment of the present application provides an electronic device adapted to process an image of a logistics parcel, including:

a housing, a processor, a memory, a circuit board, and a power supply circuit; wherein the circuit board is arranged inside a space enclosed by the housing; the processor and the memory are arranged on the circuit board; the power supply circuit is configured to supply power to various circuits or components of the electronic device; the memory is configured to store executable program codes; and the processor is configured to read and execute the program codes stored in the memory to perform the following operations:

capturing a Nth image of a parcel moving in a field of view; where N is a natural number;

identifying a barcode in the Nth image to acquire information of the barcode, and placing the information of the barcode into a queue; wherein the information of the barcode includes a position of the barcode relative to the Nth image;

predicting a position that the barcode in the Nth image would locate in a (N+1)th image to be captured;

capturing the (N+1)th image of the parcel;

identifying a barcode in the (N+1)th image to acquire information of the barcode in the (N+1)th image; wherein the information of the barcode in the (N+1)th image includes a position of the barcode relative to the (N+1)th image;

determining whether the position of the barcode in the (N+1)th image relative to the (N+1)th image matches with the predicted position;

if so, placing the information of the barcode in the (N+1)th image into the queue; and after the parcel leaves the field of view, selecting, according to a preset optimal position of the barcode in an image and the information of the barcode placed into the queue, an optimal image from all images captured for the parcel.

In a fifth aspect, an embodiment of the present application provides an application program, which performs, when being executed, the method for processing an image of a logistics parcel as provided in the embodiments of the present application. The method includes:

capturing a Nth image of a parcel moving in a field of view; where N is a natural number;

identifying a barcode in the Nth image to acquire information of the barcode, and placing the information of the barcode into a queue; wherein the information of the barcode includes a position of the barcode relative to the Nth image;

predicting a position that the barcode in the Nth image would locate in a (N+1)th image to be captured;

capturing the (N+1)th image of the parcel;

identifying a barcode in the (N+1)th image to acquire information of the barcode in the (N+1)th image; wherein the information of the barcode in the (N+1)th image includes a position of the barcode relative to the (N+1)th image;

determining whether the position of the barcode in the (N+1)th image relative to the (N+1)th image matches with the predicted position;

if so, placing the information of the barcode in the (N+1)th image into the queue; and after the parcel leaves the field of view, selecting, according to a preset optimal position of the barcode in an image and the information of the barcode placed into the queue, an optimal image from all images captured for the parcel.

In a sixth aspect, an embodiment of the present application provides a storage medium, having executable program codes stored thereon which, when being executed, perform the method for processing an image of a logistics parcel as provided by the embodiments of the present application. The method includes:

capturing a Nth image of a parcel moving in a field of view; where N is a natural number;

identifying a barcode in the Nth image to acquire information of the barcode, and placing the information of the barcode into a queue; wherein the information of the barcode includes a position of the barcode relative to the Nth image;

predicting a position that the barcode in the Nth image would locate in a (N+1)th image to be captured;

capturing the (N+1)th image of the parcel;

identifying a barcode in the (N+1)th image to acquire information of the barcode in the (N+1)th image; wherein the information of the barcode in the (N+1)th image includes a position of the barcode relative to the (N+1)th image;

determining whether the position of the barcode in the (N+1)th image relative to the (N+1)th image matches with the predicted position;

if so, placing the information of the barcode in the (N+1)th image into the queue; and after the parcel leaves the field of view, selecting, according to a preset optimal position of the barcode in an image and the information of the barcode placed into the queue, an optimal image from all images captured for the parcel.

In the method, apparatus and system for processing an image of a logistics parcel as provided by the embodiments of the present application, a Nth image of a parcel moving in a field of view is captured. A barcode in the Nth image is identified to acquire information of the barcode, the information of the barcode including a position of the barcode relative to the Nth image. A position that the barcode in the Nth image would locate in a (N+1)th image to be captured is predicted. A barcode in the (N+1)th image is identified to acquire a position of the barcode relative to the (N+1)th image. A determination is made as to whether the position of the barcode in the (N+1)th image relative to the (N+1)th image matches with the predicted position. If so, the information of the barcode in the (N+1)th image into the queue. After the parcel leaves the field of view, an optimal image is selected from all images captured for the parcel according to a preset optimal position of the barcode in an image and the information of the barcode placed into the queue. With a barcode being identified, tracked and matched as described above, an optimal image can be selected from all the captured images of a parcel.

BRIEF DESCRIPTION OF THE DRAWINGS

To describe the solutions of embodiments of the invention or the prior art more clearly, the accompanying drawings to be used in the description of embodiments or the prior art will are described briefly below. Obviously, the accompanying drawings described below are merely drawings of some embodiments of the invention. Those skilled in the art may obtain other drawings based on these accompanying drawings without creative efforts.

DETAILED DESCRIPTION

The embodiments of the present application are described in detail below with reference to the accompanying drawings.

It should be understood that the described embodiments are only a part of but not all the embodiments of the present application. All other embodiments obtained without creative efforts in view of the embodiments of the present application by those skilled in the art fall within the scope of the present application.

Figure 1:
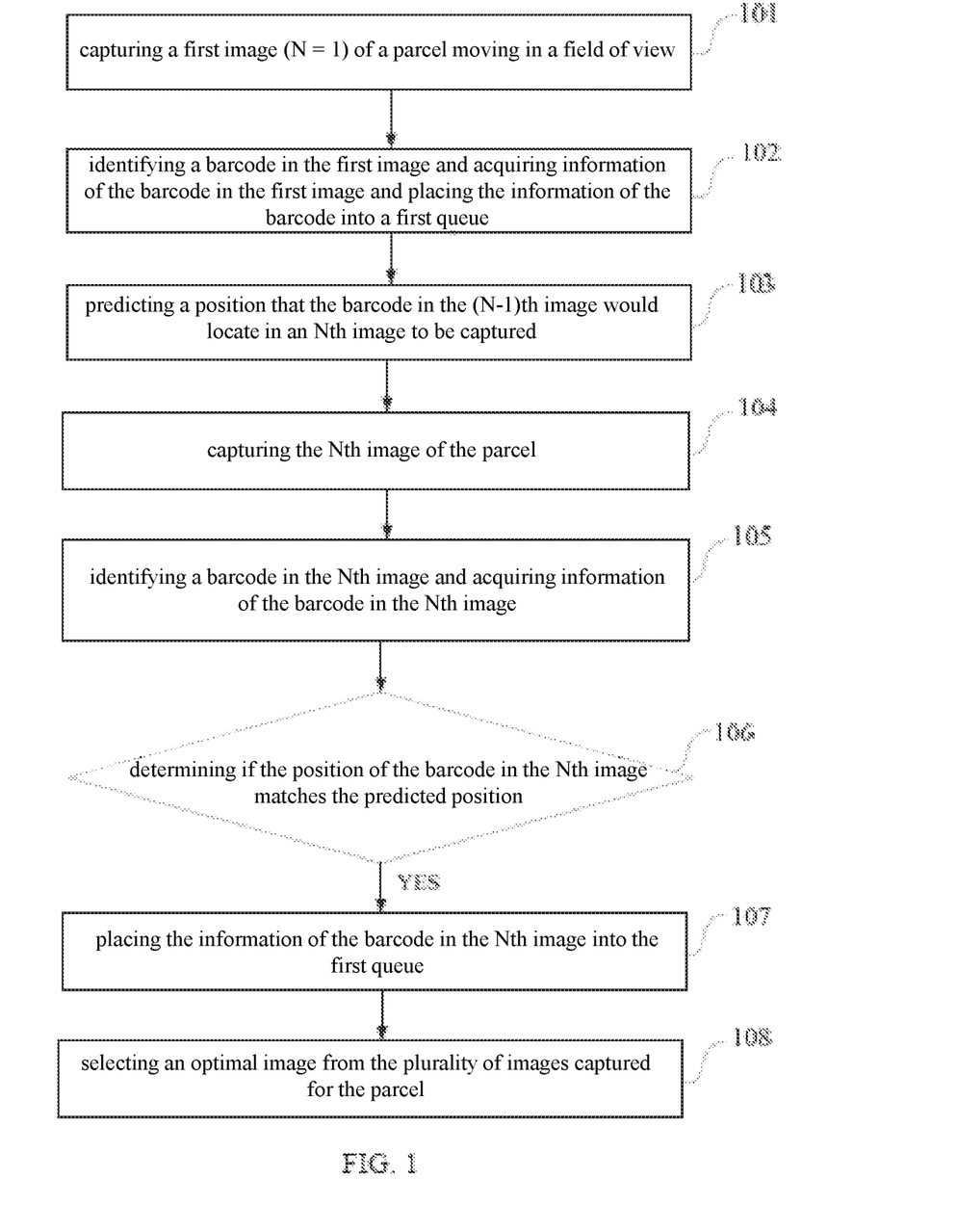
FIG. 1 is a schematic flowchart of a method for processing an image of a logistics parcel according to a first embodiment of the present application.

FIG. 1 is a schematic flowchart of a method for processing an image of a logistics parcel according to a first embodiment of the present application. This embodiment can be utilized to acquire information for a parcel that is being transferred by a conveyor. As shown in FIG. 1, the method in this embodiment may include the following operations.

At 101, a Nth image of a parcel moving in the field of view is captured.

In this embodiment, N is a natural number.

The parcel may be an item such as a packing box or a packing bag, having one or more barcodes disposed thereon. The barcode may be a one-dimensional code (also known as a barcode) or a two-dimensional code. In this embodiment, description is provided with reference to an example in which only one barcode is disposed.

Figure 2:
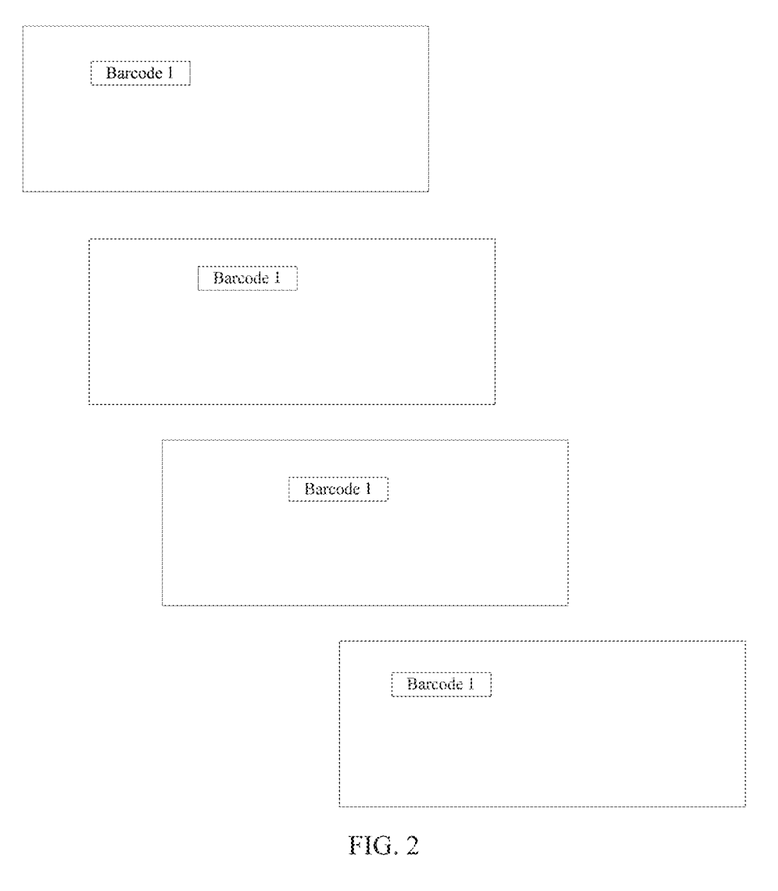
FIG. 2 is a schematic diagram of a sequence of images of a parcel from a parcel's entry into the field of view till its departure therefrom according to an embodiment.

When a moving parcel, such as a parcel on a conveyor belt, gradually moves into a field of view of an image acquisition device such as a camera, the image acquisition device may capture an image of the parcel moving in the field of view at a predetermined interval (e.g., 0.3 s or 0.5 s). A sequence of images of the parcel, from its entry into the field of view till its departure therefrom, can thus be obtained. FIG. 2 is a schematic diagram of a sequence of images of a parcel, as obtained in an embodiment of the present application, from the parcel's entry into the field of view till the departure therefrom.

In this embodiment, a parcel's entry into the field of view can be indicated by a laser trigger signal.

At 102, a barcode in the Nth image is identified to acquire information of the barcode, and the information of the barcode is placed into a queue.

The information of the barcode includes a position of the barcode relative to the Nth image. In an optional implementation, the position included in the information of the barcode is a position of a vertex of a polygon (e.g., a rectangle) that circumscribes the barcode in the image.

In this embodiment, a barcode identification algorithm may be called in real time to obtain the identification information of the barcode in a currently captured image, so as to obtain the position of the barcode relative to the Nth image.

In this embodiment, when the information of a barcode is obtained for the first time, an initial queue may be established. The barcode information as obtained is then placed into the initial queue. When a new image is captured, a position of a barcode in the new image is determined, and is then matched with a predicted position of the previous barcode. When the difference between these two positions satisfies a threshold requirement, the barcode in the new image is considered as the very same one with the previous code. The information of the barcode in the new image is then place into the same queue as the previous code. The predicted position of the previous code can be obtained according to the method described in step 103.

At 103, a position that the barcode in the Nth image would locate in a (N+1)th image to be captured is predicted.

Accurate identification cannot be, for each time, fully guaranteed for all the barcodes. A tracking algorithm can be used to predict the position of a barcode in a current image. The predicted position is used to evaluate the moving speed of the barcode in the X, Y direction, and predict its position in a next image.

Tracking algorithms that can be used in this embodiment include, but are not limited to, Kalman Filter, Particle Filter (PF), and the like. These algorithms can be used to predict in real time a position that a barcode in the Nth image would locate in a (N+1)th image as captured.

In this embodiment, the position of the barcode in the (N+1)th image may also be predicted according to the position of the barcode in the Nth image, the moving speed of the parcel, and the capture period of the camera.

At 104, the (N+1)th image of the parcel is captured.

In this embodiment, after the Nth image of the parcel is captured, when the next capture period arrives, the (N+1)th image of the parcel is captured.

At 105, a barcode in the (N+1)th image is identified to acquire information of the barcode in the (N+1)th image.

The information of the barcode in the (N+1)th image includes the position of the barcode relative to the (N+1)th image. In an optional implementation, the position included in the information of the barcode is a position of a vertex of a polygon (e.g., a rectangle) that circumscribes the barcode in the image.

In this embodiment, a barcode identification algorithm may be called in real time to obtain identification information of a barcode in a currently captured image, so as to obtain the position of the barcode relative to the (N+1)th image.

At 106, a determination is made as to whether the position of the barcode in the (N+1)th image matches with the predicted position.

In this embodiment, the determination of a match with the predicted position is made based on the coincidence of edges of the barcodes.

In an optional implementation, the determination as to whether the position of the barcode in the (N+1)th image matches with the predicted position can be made by determining whether a distance between a center of the position of the barcode in the (N+1)th image relative to the (N+1)th image and a center of the predicted position of the barcode satisfies a predetermined threshold requirement. If so, it is determined that the position of the barcode relative to the (N+1)th image matches with the predicted position.

In this embodiment, the method proceeds to box 107 if the position of the barcode in the (N+1)th image matches with the predicted position.

At 107, the information of the barcode in the (N+1)th image is placed into the queue.

In this embodiment, if the position of the barcode in the (N+1)th image relative to the (N+1)th image matches with the predicted position, then the barcode in the (N+1)th image is determined to be the very same one as the barcode in the Nth image. Thus, the information of them can be placed into the same queue. If the position of the barcode in the (N+1)th image does not match with the predicted position, the information of the barcode in the (N+1)th image is placed into another queue, for example, a newly created queue.

At 108, an optimal image is selected from all images captured for the parcel.

In this embodiment, after the departure of the parcel from the field of view, an optimal image is selected from all images captured for the parcel according to a preset optimal position of the barcode in the image and the information of the barcode that has been placed into the queue. In this embodiment, departure of the parcel from the field of view may be indicated by a laser triggered signal.

In this embodiment, as an optional implementation, after the parcel's departure from the field of view, a center of the barcode in each captured image may be respectively determined according to the position of the barcode that has been placed into the queue. The centers may be represented as center={$center_1$, $center_2$, . . . , $center_{n-1}$, $center_n$}. An image the center of which is closest to the center of the barcode is selected, from all the captured images, as the optimal image; or otherwise, an image in which the center of the barcode is closest to a center of a preset area is selected, from all the captured images, as the optimal image.

Figure 3:
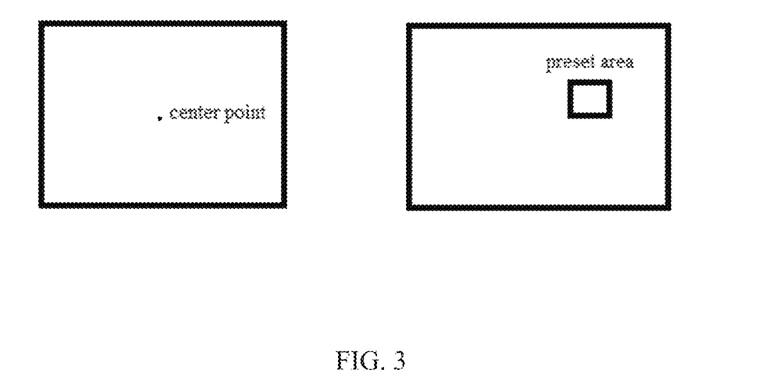
FIG. 3 is a schematic diagram of a center of an image and a user-preset region in the image for the first embodiment of the method for processing an image of a logistics parcel according to the present application.

The preset area may be an area set by the user in an image.

FIG. 3 shows a schematic diagram of a center of an image and a user-preset area in the image.

With a barcode being identified, tracked and matched as described in the embodiment of a method for processing an image of a logistics parcel, an optimal image can be selected from all the captured images of a parcel.

It is noted that the optimal image as selected in this embodiment may be saved as logistics evidence. In case of loss or damage, a stage in which the loss occurs can be determined with reference to the logistics evidence provided by the image. The optimal image can also be stored as logistics parcel information for user query, so that a user can have a more intuitive observation of the parcel. As such, the logistics process has an enhanced visibility. Further, with a proper position of the barcode in each image, more consistent image information can be obtained. This may facilitate subsequent management and provide viewing pleasure for user's observation of parcels.

In one implementation of the first embodiment of the foregoing method for processing an image of a logistics parcel, the method may further include an operation of outputting the optimal image as selected. In this embodiment, the selected optimal image may be output to a database, such as a database of a personal computer or a handheld terminal.

In one implementation of the first embodiment of the foregoing method for processing an image of a logistics parcel, the information of the barcode further includes an identification result for the barcode. The method may further include an operation of performing character fusion on the identification result of the barcode.

In an embodiment, it is assumed that M images are captured for a barcode, and the barcode is then identified for M times. The identification result for each time may not be identical due to external interference. Character fusion may be needed so as to output an optimal identification result.

Figure 4:
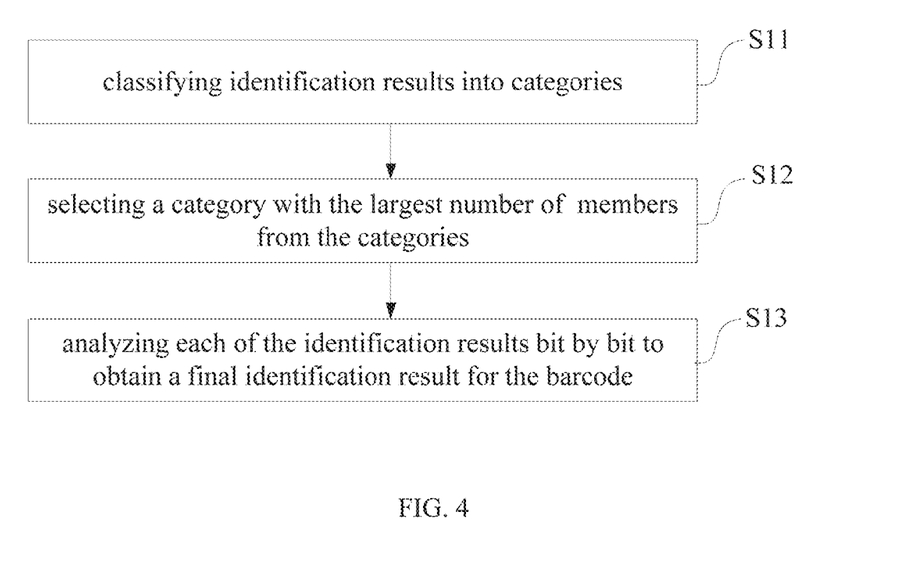
FIG. 4 is a schematic flowchart of character fusion for the first embodiment of the logistics parcel image processing method according to the present application.

FIG. 4 is a schematic flowchart of character fusion in an embodiment of the method for processing an image of a logistics parcel according to the present application. Referring to FIG. 4, specifically, in this embodiment, character fusion on the identification results of the barcode includes the following operations.

At S11, the identification results are classified into categories.

For one specific barcode, after the parcel leaves the field of view, the identification results for a barcode in all captured images are classified into categories in terms of the number of characters contained in each of the identification results. For example, M identification results for one specific barcode in all captured images may be classified into N categories.

A class contains members (i.e., identification results of a barcode). Members in the same class all have the same number of characters. The number varies from one class to another.

In this embodiment, if the position of a barcode in the (N+1)th image matches with a predicted position that a barcode in the Nth image would have, they can be considered as the very same barcode. Thus, the information of the barcodes is placed into the same queue. If a position of a barcode in the (N+1)th image does not match with the predicted position, they are not considered as the same barcode, and the information thereof is thus placed to separate queues.

At S12, a category that has the largest number of members is selected from the categories.

Figure 5:
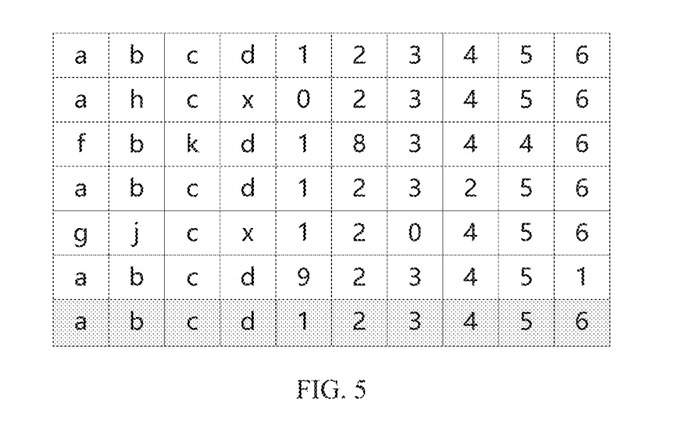
FIG. 5 is a schematic structural diagram of character fusion in the first embodiment of the method for processing an image of a logistics parcel according to the present application.

FIG. 5 is a schematic structural diagram of character fusion in the embodiment. In FIG. 5, the strings in lines 1-6 are selected categories that have the largest number of class members (6) among all the categories. The bottom line is a final identification result after the character fusion.

At S13, the identification results are subject to a bitwise analysis to obtain an end identification result for the barcode.

In this embodiment, the identification results as selected are subject to a bitwise analysis. A character that appears with the highest frequency in each bit is taken as an identification result for that bit. The final identification result of the barcode is thus obtained. As a specific embodiment, a final identification result of a barcode as shown by the bottom string in FIG. 5 is obtained.

The operations of performing character fusion on the identification result for the barcode may be implemented before or after the selection of the optimal image.

Through the operations above, a more accurate final identification result for the barcode can be obtained.

Optionally, the final identification result for the barcode may be output.

As an optional implementation, the final identification result for the barcode may be superimposed on the optimal image as selected.

For example, the final identification result for the barcode is placed on a blank area on the optimal image, or the final identification result for the barcode is superimposed on the corresponding barcode in the optimal image, or, the final identification result for the barcode is placed below the corresponding barcode for the optimal image.

Figure 6:
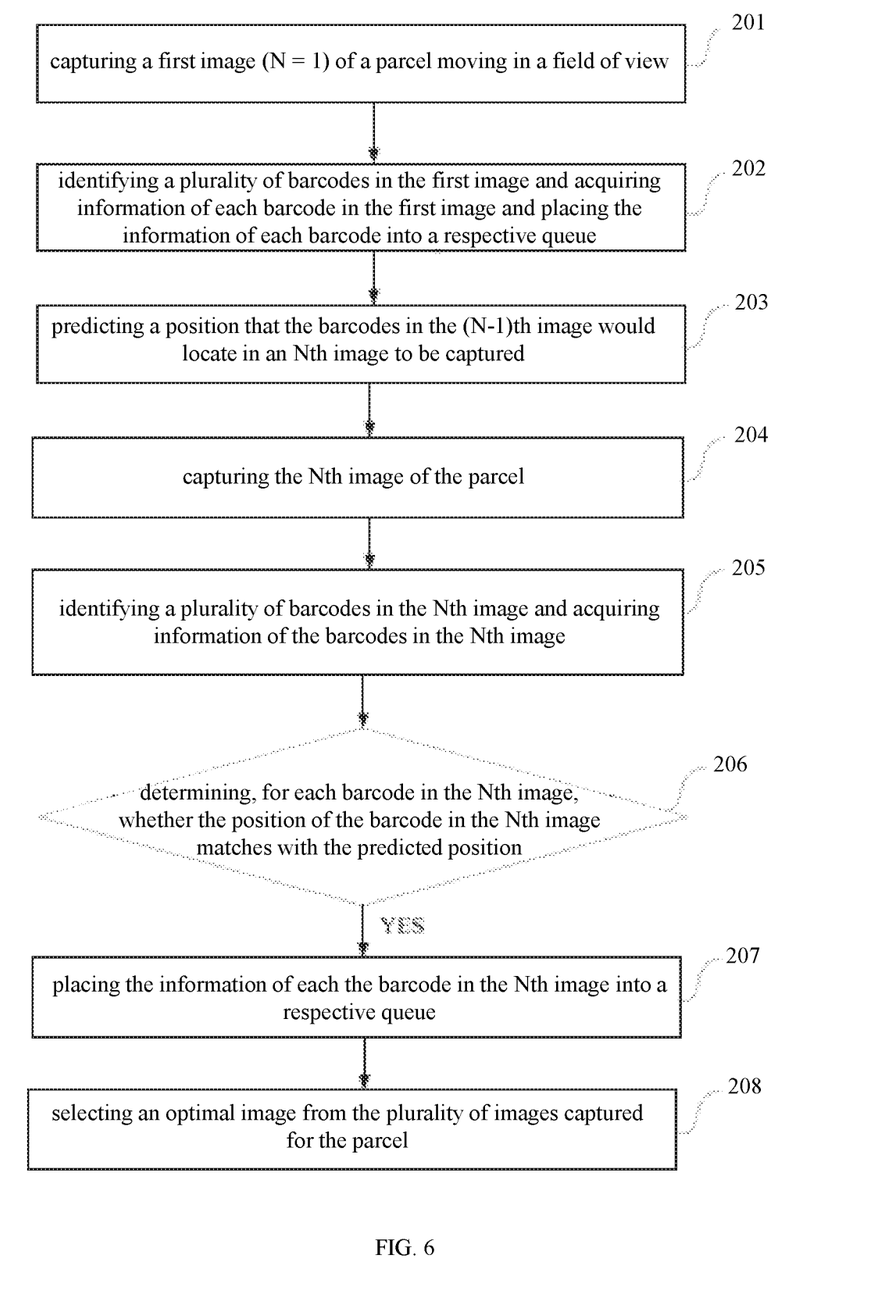
FIG. 6 is a schematic flowchart of a method for processing an image of a logistics parcel according to a second embodiment of the present application.

FIG. 6 is a schematic flowchart of a method for processing an image of a logistics parcel according to a second embodiment of the present application. This embodiment is suitable for acquiring information of a parcel being transferred on a conveyor. As shown in FIG. 6, the method in this embodiment may include the following operations.

At 201, a Nth image of a parcel moving in the field of view is captured.

In this embodiment, N is a natural number.

The parcel may be an item such as a packing box or a packing bag, having one or more barcodes disposed thereon. The barcode may be a one-dimensional code (also known as a barcode) or a two-dimensional code. In this embodiment, description is provided with reference to an example in which only one barcode is disposed.

When a moving parcel, such as a parcel on a conveyor belt, gradually moves into a field of view of an image acquisition device such as a camera, the image acquisition device captures an image of the parcel moving in the field of view at a predetermined interval (e.g., 0.3 s or 0.5 s). A sequence of images of the parcel, from the parcel's entry into the field of view till its departure from the field of view, can thus be obtained. In this embodiment, the parcel's entry into the field of view can be indicated by a laser trigger signal.

At 202, a plurality of barcodes in the Nth image are identified to acquire information of the barcodes, and the information of each of the barcodes is placed into a separate queue; wherein the information of each barcode includes a position of the barcode relative to the Nth image.

For example, in this embodiment, two barcodes, a first barcode and a second barcode, as included in the Nth image may be identified so as to obtain the information thereof. The information of the first barcode is placed into a first queue, and the information of the second barcode is placed into a second queue.

The information of the first barcode includes a position of the first barcode in the Nth image relative to the Nth image. The information of the second barcode includes a position of the second barcode in the Nth image relative to the Nth image.

Of course, the Nth image may include 3, 4 or more barcodes. The embodiment is not limited in this aspect. The following description is provided with reference to an example in which the Nth image contains 2 barcodes.

In an optional implementation, a position of a barcode in any image includes a position of a vertex of a polygon (e.g., a rectangle) that circumscribes the barcode in the image.

In this embodiment, a barcode identification algorithm may be called in real time to obtain the identification information of the barcodes in a current captured image, so as to obtain the positions of the first barcode and the second barcode in the Nth image relative to the Nth image, respectively.

In this embodiment, when the information of a barcode is obtained for the first time, an initial queue may be established. The barcode information as obtained is placed into the initial queue. When a new image is captured, a position of a barcode in the new image is determined. First, the position is matched with a predicted position of a previous code. When the difference between these positions satisfies a threshold requirement, the barcode in the new image is considered as the very same one with the previous code. The information of the barcode in the new image is then placed into the queue. If the difference between the two positions does not satisfy the threshold requirement, the barcode in the new image is considered as a different code, and the information of the barcode in the new image is placed into another queue. The predicted position of the previous code can be obtained according to the method described in step 203.

At 203, positions that the barcodes in the Nth image would locate in the (N+1)th captured image are predicted.

A position may be predicted for each of the barcodes contained in an image.

Accurate identification cannot be, for each time, fully guaranteed for all the barcodes, a tracking algorithm can thus be used to predict the position of a barcode in a current image. The predicted position is used to evaluate the moving speed of the barcode in the X, Y direction, and predict its position in a next image.

Tracking algorithms that can be used in this embodiment include, but are not limited to, Kalman Filter, Particle Filter (PF), and the like. The algorithms can be used to predict in real time a position that a barcode in the Nth image would locate in the (N+1)th image as captured.

In this embodiment, the position of the barcode in the (N+1)th captured image may also be predicted according to the relative position of the barcode in the Nth image, the moving speed of the parcel, and the capture period of the camera.

At 204, a (N+1)th image of the parcel is captured.

In this embodiment, after the Nth image is captured for the parcel, when the next capture period arrives, the (N+1)th image is captured for the parcel.

At 205, a plurality of barcodes in the (N+1)th image are identified to acquire information of the barcodes in the (N+1)th image.

The information of a first barcode in the (N+1)th image includes a position of the first barcode in the (N+1)th image. The information of a second barcode in the (N+1)th image includes a position of the second barcode in the (N+1)th image.

In an optional implementation, the position included in the information of the first barcode is a position of a vertex of a polygon (e.g., a rectangle) that circumscribes the first barcode in the image; the position included in the information of the second barcode is a position of a vertex of a polygon (e.g., a rectangle) that circumscribes the second barcode in the image.

At 206, for each barcode in the (N+1)th image, a determination is made as to whether the position of the barcode in the (N+1)th image relative to the (N+1)th image matches with the predicted position of the barcode in the (N+1)th image as captured.

In this embodiment, for each barcode in the (N+1)th image, a determination is made as to whether a distance between a center of the position of the barcode in the (N+1)th image relative to the (N+1)th image and a center of the predicted position that the barcode would locate in the (N+1)th image satisfies a predetermined threshold requirement; if so, it is determined that the position of the barcode in the (N+1)th image matches with the predicted position that the barcode would locate in the (N+1)th image as captured. The information of each barcode whose position in the (N+1)th image matches with the predicted position into a separate queue.

In this embodiment, the process and method of determining, for each barcode in the (N+1)th image, whether the position of the barcode in the (N+1)th image matches with the predicted position are similar to step 106 in the foregoing method embodiment, the detail of which is thus omitted here.

In this embodiment, the method proceeds to step 107 in response to a determination that, for each barcode in the (N+1)th image, the position of the barcode in the (N+1)th image matches with the predicted position.

At 207, the information of each barcode whose position in the (N+1)th image matches with the predicted position is placed into a separate queue .

For example, if it is determined at 206 that the position of a first barcode in the (N+1)th image relative to the (N+1)th image matches with the predicted position of a first barcode in the (N+1)th image, the information of the first barcode in the (N+1)th image is then placed into a first queue; or if it is determined that the position of a second barcode in the (N+1)th image matches with the predicted position of the second barcode in the (N+1)th image, the information of the second barcode in the (N+1)th image is placed into a second queue.

At 208, an optimal image is selected from all the images captured for the parcel.

In this embodiment, selecting, after the parcel leaves the field of view, an optimal image from all the images captured for the parcel according to the optimal relative position of the preset barcode relative to the image and the information of the barcodes added to each queue. In this embodiment, the signal that the parcel leaves the field of view can be obtained according to the laser trigger signal.

In this embodiment, as an optional implementation, after the parcel leaves the field of view, a common center for the first barcode and the second barcode in each captured image may be determined according to the information of the first barcode placed into the first queue and the information of the second barcode placed into the second queue. An image in which the common center for the first barcode and the second barcode is closest to the center of the image is selected, from all the captured images, as an optimal image. Alternatively, an image in which the common center for the plurality of barcodes is closest to the center of a preset area is selected, from all the captured images, as the optimal image.

With a barcode being identified, tracked and matched as described above in embodiments of the method for processing an image of a logistics parcel, an optimal image can be selected from all the captured images of a parcel On the basis of the second embodiment of the foregoing method for processing an image of a logistics parcel, in an optional implementation, the method for processing an image of a logistics parcel may further include the step of: outputting the optimal image as selected. In this implementation, the selected optimal image may be output to a database, such as a database of a personal computer or a handheld terminal.

On the basis of the second embodiment of the method for processing an image of a logistics parcel, In an optional embodiment, the information of the barcode further includes an identification result for the barcode; and the method further includes the step of performing character fusion on the identification result of each barcode.

In this embodiment, the character fusion on the identification result for one of the plurality of barcodes may be implemented in a similar way as shown in FIG. 4 with respect to the foregoing method embodiment. Details are thus omitted here.

On the basis of the second embodiment of the method for processing an image of a logistics parcel, in an optional embodiment, the final identification results of the plurality of barcodes may be superimposed on the selected optimal image.

For example, the final identification result of the first barcode is superimposed on the first barcode of the optimal image, the final identification result of the second barcode is superimposed on the second barcode of the optimal image, . . . , and the final identification result of the mth barcode is superimposed on the mth barcode of the optimal image, where m is the number of barcodes on the logistics parcel.

Alternatively, the final identification result of the first barcode may be placed below the first barcode of the optimal image, the final identification result of the second barcode may be placed below the second barcode of the optimal image, . . . , and the final identification result of the mth barcode may be placed below the mth barcode of the optimal image, where m is the number of barcodes on the logistics parcel.

With the plurality of barcodes being identified, tracked and matched as described in the embodiment, an optimal image can be selected from all the captured images of a parcel.

Figure 7:
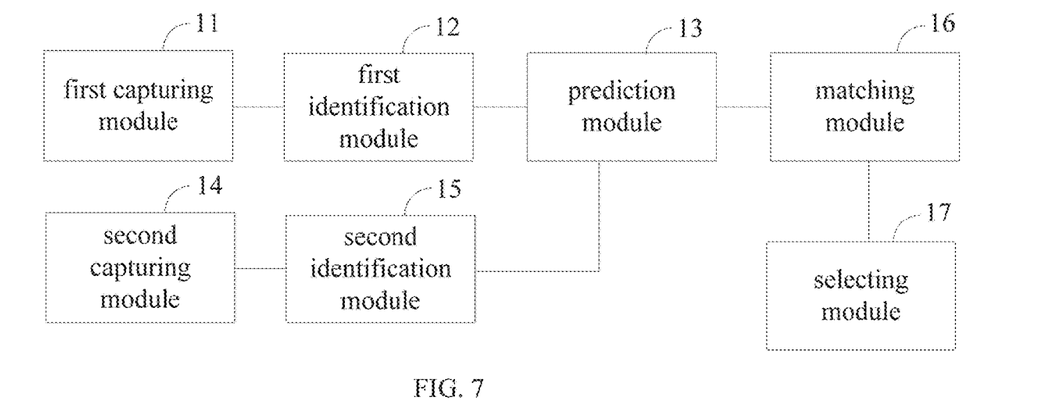
FIG. 7 is a schematic structural diagram of an apparatus for processing an image of a logistics parcel according to an embodiment of the present application.

FIG. 7 is a schematic diagram of an apparatus for processing an image of a logistics parcel according to an embodiment of the present application. The apparatus is adapted to acquire information of a parcel being transferred on the conveyor. As shown in FIG. 7, the apparatus for processing an image of a logistics parcel of this embodiment may include: a first capturing module 11, a first identification module 12, a prediction module 13, a second capturing module 14, a second identification module 15, a matching module 16, and a selecting module 17.

The first capturing module 11 is configured for capturing a Nth image of a parcel moving in a field of view; where N is a natural number.

The first identification module 12 is configured for identifying a barcode in the Nth image to acquire information of the barcode, and placing the information of the barcode into a queue; wherein the information of the barcode comprises a position of the barcode relative to the Nth image.

The prediction module 13 is configured for predicting a position that the barcode in the Nth image would locate in a (N+1)th image to be captured.

The second capturing module 14 is configured for capturing the (N+1)th image of the parcel.

The second identification module 15 is configured for identifying a barcode in the (N+1)th image to acquire information of the barcode in the (N+1)th image; wherein the information of the barcode in the (N+1)th image comprises a position of the barcode relative to the (N+1)th image.

The matching module 16 is configured for determining whether the position of the barcode in the (N+1)th image relative to the (N+1)th image matches with the predicted position in the (N+1)th image, and if so, placing the information of the barcode in the (N+1)th image into the queue.

The selecting module 17 is configured for selecting, after the parcel leaves the field of view, an optimal image from all the images captured for the parcel according to a preset optimal position of the barcode in an image and the information of the barcode placed into the queue.

In this embodiment, preferably, the first capturing module 11 and the second capturing module 14 are implemented as a single module. However, they may also be implemented as two separate modules. Similarly, the first identification module 12 and the second identification module 15 may be implemented as a single module, or as two separate modules.

The apparatus in this embodiment may be used to implement the technical solution of the method embodiment shown in FIG. 1. As the implementation principle and technical effects are similar, and details are not described herein again.

In the first embodiment of the apparatus for processing an image of a logistics parcel, optionally, a position of a barcode in an image relative to the image comprises: a position of a vertex of a polygon that circumscribes the barcode in the image.

In the first embodiment of the apparatus for processing an image of a logistics parcel, optionally, the matching module 16 may include:

a first determining sub-module, configured for determining a center of the barcode in the (N+1)th image, and a predicted center of the barcode; and a decision sub-module, configured for determining whether a distance between the center of the position of the barcode in the (N+1)th image relative to the (N+1)th image and a center of the predicted position of the barcode satisfies a predetermined threshold requirement; and if so, determining that the position of the barcode in the (N+1)th image relative to the (N+1)th image matches with the predicted position.

In this embodiment, if the position of the barcode in the (N+1)th image matches with the predicted position, it can be determined the barcode in the (N+1)th image is the same barcode as the barcode in the Nth image. The information of the barcodes is placed into the same queue. Or otherwise, if the position of the barcode in the (N+1)th image relative to the (N+1)th image does not match with the predicted position, it can be determined the barcode in the (N+1)th image is not the same barcode as the barcode in the Nth image. The information of the barcodes is placed into separate queues.

In the first embodiment of the apparatus for processing an image of a logistics parcel, optionally, the selecting module 17 may include: a second determining sub-module and a selecting sub-module.

The second determining sub-module, configured for determining, after the parcel leaves the field of view, a center of the barcode in each image as captured according to the information of the barcode placed in the queue.

The selecting sub-module, configured for selecting, from all the captured images, an image the center of which is closest to the center of the barcode as the optimal image; or selecting, from all the captured images, an image in which the center of the barcode is closest to a center of a preset area as the optimal image.

In the first embodiment of the apparatus for processing an image of a logistics parcel, optionally, the apparatus further includes: an image output module, configured for outputting the optimal image selected by the selecting module. In this embodiment, the optimal image as selected may be output to a database, such as a database of a personal computer or a handheld terminal.

In the first embodiment of the apparatus for processing an image of a logistics parcel, optionally, information of a barcode further comprises an identification result for the barcode. Accordingly, the apparatus further includes: a character fusion module, configured for classifying, after the parcel leaves the field of view, identification results for a barcode in all captured images into categories in terms of the number of characters contained in each of the identification results; selecting, from the categories, a category that has the largest number of members; and for the selected category, analyzing each of the identification results for the barcode bit by bit, and taking a character that appears with the highest frequency in each bit as an identification result for the bit, so as to obtain a final identification result for the barcode.

The character fusion on an identification result of the barcode in this embodiment can be implemented the same way as the method embodiments. Details are omitted here.

In this embodiment, the character fusion technology can accurately determine a final identification result for a barcode, so that a more accurate identification result can be obtained.

In the first embodiment of apparatus for processing an image of a logistics parcel, optionally, the apparatus further includes: a superimposed module, configured for superimposing the final identification result for the barcode on the optimal image as selected.

In an optional implementation, there are a plurality of barcodes in a captured image, the first identification module is then specifically configured for identifying the plurality of barcodes in the Nth image to acquire information of the barcodes, and placing information of each of the barcodes into a separate queue; wherein, the information of each of the barcodes includes a position of the barcode relative to the Nth image.

The matching module is specifically configured for determining, for each barcode in the (N+1)th image, whether a distance between a center of the position of the barcode in the (N+1)th image relative to the (N+1)th image and a center of the predicted position that the barcode would locate in the (N+1)th image satisfies a predetermined threshold requirement; and if so, determining that the position of the barcode in the (N+1)th image relative to the (N+1)th image matches with the predicted position that the barcode would locate in the (N+1)th image as captured, and placing the information of each barcode whose position relative to the (N+1)th image matches with the predicted position to a separate queue.

The selecting module is specifically configured for, for each captured image, acquiring, after the parcel leaves the field of view, a position of each barcode relative to the image from a plurality of queues respectively, and determining a common center for the plurality of barcodes in the image; selecting, from all the captured images, an image in which the common center for the plurality of barcodes is closest to the center of the image as the optimal image; or selecting, from all the captured images, an image in which the common center for the plurality of barcodes is closest to the center of a preset area as the optimal image.

In this embodiment, with a barcode being identified, tracked and matched as described above, an optimal image can be selected from all the captured images of a parcel.

The embodiments of the present application further provide a system for processing an image of a logistics parcel, including: a conveyor belt and an apparatus for processing an image of a logistics parcel according to any of the preceding implementations; wherein the conveyor belt is used to convey a parcel; and apparatus is configured to capture an image of a parcel placed on the conveyor as the parcel enter a field of view, and process the image as captured.

The system for processing an image of a logistics parcel provided in the embodiment may be used to implement the technical solution of the method embodiment shown in FIG. 1 or FIG. 6. The same implementation principle is involved and similar technical effects are achieved. Details are thus not described herein again.

The embodiments of the present application further provide an electronic device, adapted to process an image of a logistics parcel. The electronic device includes:

a housing, a processor, a memory, a circuit board, and a power supply circuit; wherein the circuit board is arranged inside a space enclosed by the housing; the processor and the memory are arranged on the circuit board; the power supply circuit is configured to supply power to various circuits or components of the electronic device; the memory is configured to store executable program codes; and the processor is configured to read and execute the program codes stored in the memory to perform the following operations:

capturing a Nth image of a parcel moving in a field of view; where N is a natural number;

identifying a barcode in the Nth image to acquire information of the barcode, and placing the information of the barcode into a queue; wherein the information of the barcode comprises a position of the barcode relative to the Nth image;

predicting a position that the barcode in the Nth image would locate in a (N+1)th image to be captured;

capturing the (N+1)th image of the parcel;

identifying a barcode in the (N+1)th image to acquire information of the barcode in the (N+1)th image; wherein the information of the barcode in the (N+1)th image comprises a position of the barcode relative to the (N+1)th image;

determining whether the position of the barcode in the (N+1)th image relative to the (N+1)th image matches with the predicted position;

if so, placing the information of the barcode in the (N+1)th image into the queue; and after the parcel leaves the field of view, selecting, according to a preset optimal position of the barcode in an image and the information of the barcode placed into the queue, an optimal image from all images captured for the parcel.

With a barcode being identified, tracked and matched as described in the embodiment of a method for processing an image of a logistics parcel, an optimal image can be selected from all the captured images of a parcel.

The electronic device in the above embodiments may exist in various forms including, but not limited to:

(1) Mobile communication equipment, characterized by its mobile communication function and mainly used to provide voice and data communication. Such terminals include smart phones (such as iPhones), multimedia phones, functional mobile phones, and low-end mobile phones.

(2) Ultra-mobile personal computer, a type of personal computer category, has calculation and processing functions, and generally features mobile Internet access. Such terminals include: PDAs, MIDs, and UMPC devices (e.g. the iPad).

(3) Portable Entertainment Devices, capable of displaying and playing multimedia content. Such devices include: audio and video players (such as iPods), handheld game consoles, e-books, and smart toys and portable car navigation devices.

(4) Server, a device that provides computing services. A server includes a processor, a hard disk, a memory, a system bus, and a similar architecture of a general computer. However, due to the need to provide highly reliable services, it has higher requirements in terms of processing power, stability, reliability, security, scalability, manageability, etc.

(5) Other electronic devices that have data interaction capabilities.

An embodiment of the present application provides an application program, which performs, when being executed, the method for processing an image of a logistics parcel as provided by the embodiments described above. The method includes:

capturing a Nth image of a parcel moving in a field of view; where N is a natural number;

identifying a barcode in the Nth image to acquire information of the barcode, and placing the information of the barcode into a queue; wherein the information of the barcode comprises a position of the barcode relative to the Nth image;

predicting a position that the barcode in the Nth image would locate in a (N+1)th image to be captured;

capturing the (N+1)th image of the parcel;

identifying a barcode in the (N+1)th image to acquire information of the barcode in the (N+1)th image; wherein the information of the barcode in the (N+1)th image comprises a position of the barcode relative to the (N+1)th image;

determining whether the position of the barcode in the (N+1)th image relative to the (N+1)th image matches with the predicted position;

if so, placing the information of the barcode in the (N+1)th image into the queue; and after the parcel leaves the field of view, selecting, according to a preset optimal position of the barcode in an image and the information of the barcode placed into the queue, an optimal image from all images captured for the parcel.

With a barcode being identified, tracked and matched as described in the embodiment of a method for processing an image of a logistics parcel, an optimal image can be selected from all the captured images of a parcel.

An embodiment of the present application provides a storage medium, having executable program codes stored thereon which, when being executed, perform the method for processing an image of a logistics parcel as provided in the embodiments described above. The method includes:

capturing a Nth image of a parcel moving in a field of view; where N is a natural number;

identifying a barcode in the Nth image to acquire information of the barcode, and placing the information of the barcode into a queue; wherein the information of the barcode comprises a position of the barcode relative to the Nth image;

predicting a position that the barcode in the Nth image would locate in a (N+1)th image to be captured;

capturing the (N+1)th image of the parcel;

identifying a barcode in the (N+1)th image to acquire information of the barcode in the (N+1)th image; wherein the information of the barcode in the (N+1)th image comprises a position of the barcode relative to the (N+1)th image;

determining whether the position of the barcode in the (N+1)th image relative to the (N+1)th image matches with the predicted position;

if so, placing the information of the barcode in the (N+1)th image into the queue; and after the parcel leaves the field of view, selecting, according to a preset optimal position of the barcode in an image and the information of the barcode placed into the queue, an optimal image from all images captured for the parcel.

With a barcode being identified, tracked and matched as described in the embodiment of a method for processing an image of a logistics parcel, an optimal image can be selected from all the captured images of a parcel.

It should be noted that the relationship terms used here, such as "first", "second", and the like are only used to distinguish one entity or operation from another entity or operation, but do not necessarily require or imply that there is actual relationship or order between these entities or operations. Moreover, the terms "include", "comprise", or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "include(s) a/an . . . ", "comprise(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments.

In particular, the embodiment of the apparatus is described briefly, since it is substantially similar to the embodiment of the method, and the related contents can refer to the description of the embodiment of the method It will be understood by those of ordinary skill in the art that all or part of the process in implementing the foregoing embodiment method can be completed by a computer program to instruct related hardware. The program can be stored in a computer readable storage medium, which, when executed, can include the flow of the embodiments of the method described above. The storage medium may be a magnetic disk, an optical disk, a read-only memory (ROM), or a random access memory (RAM).

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for capturing and processing a plurality of images of a surface of a logistics parcel with at least one barcode while the parcel moves through a field of view for image capture, the method comprising:

capturing a first (N=1) image of a parcel moving in a field of view;

identifying a barcode in the first image and acquiring information of the barcode in the first image, wherein the acquired information of the barcode in the first image comprises a position of the barcode relative to the image;

placing the information into a first queue;

for N=2 . . . M, with M being the number of the plurality of images, performing the following:

predicting a position that the barcode in the $(N-1)^{th}$ image would locate in an $N^{th}$ image to be captured;

capturing the Nth image of the parcel moving in the field of view;

identifying a barcode in the Nth image and acquiring information of the barcode in the $N^{th}$ image determining whether the position of the barcode in the $N^{th}$ image matches the predicted position;

placing the information of the barcode in the $N^{th}$ image into the first queue if the positions match; and after the parcel leaves the field of view, selecting, according to the information of the barcode placed into the first queue, an image from said plurality of images as an optimal image.

2. The method according to claim 1, wherein, a position of a barcode in an image comprises a position of a vertex of a polygon that circumscribes the barcode in the image;

wherein, determining whether the position of the barcode in the $N^{th}$ image matches with the predicted position comprises:

determining whether a distance between the position of the barcode in the $N^{th}$ image and the predicted position of the barcode satisfies a predetermined threshold requirement; and if so, determining that the position of the barcode in the $N^{th}$ image matches with the predicted position; and wherein, the method further comprises: outputting the optimal image as selected.

3. The method according to claim 1, wherein selecting said optimal image comprises:

determining, after the parcel leaves the field of view, for each piece of information of the barcode placed in the first queue, a center of the position in said each piece of information;

selecting, as the optimal image, from said plurality of images:

an image of which the information of the barcode has been placed in the first queue and the center of which is closest to the center of the barcode or an image of which the center of the barcode is closest to a center of a preset area.

4. The method according to claim 1, wherein, information of a barcode further comprises an identification result for the barcode;

the method further comprises:

after the parcel leaves the field of view, classifying identification results for a barcode in said plurality of images into categories in terms of the number of characters contained in each of the identification results;

selecting, from the categories, a category that has the largest number of members; and for the selected category, analyzing each of the identification results for the barcode bit by bit, and taking a character that appears with the highest frequency in each bit as an identification result for the bit, so as to obtain a final identification result for the barcode.

5. The method according to claim 4, further comprising: superimposing the final identification result for the barcode on the optimal image as selected.

6. The method according to of claim 1, further comprising:

placing, if the position of the barcode in the $N^{th}$ image does not match with the predicted position, the information of the barcode in the $N^{th}$ image into another queue.

7. The method according to claim 1, further comprising:

identifying one or more additional barcodes in each of said plurality of images and acquiring their respective information and placing the information of each of the barcodes into a respective queue different from the first queue.

8. The method according to claim 7, further comprising:

determining, for each of the additional barcodes in the $N^{th}$ image, whether a distance between a center of the position of said each barcode in the $N^{th}$ image and a center of the predicted position said each barcode would locate in the $N^{th}$ image satisfies a predetermined threshold requirement;

and placing the information of said each barcode into the respective queue for each said barcode if the distance satisfies the predetermined threshold requirement.

9. The method according to claim 7, wherein, after the parcel leaves the field of view, selecting, according to a preset optimal position of the barcode relative to an image and the information of the barcode placed into the queue, an optimal image from all images captured for the parcel comprises:

for each of said plurality of images, acquiring, after the parcel leaves the field of view, a position of each barcode relative to the image from the respective queue for each said barcode, and determining a common center for the plurality of barcodes in the image;

selecting, as the optimal image, from said plurality of images, an image in which the common center for the plurality of barcodes is closest to the center of the image; or an image in which the common center for the plurality of barcodes is closest to the center of a preset area.

10. An electronic device adapted to process an image of a logistics parcel, comprising:

a housing, a processor, a memory, a circuit board, and a power supply circuit; wherein the circuit board is arranged inside a space enclosed by the housing; the processor and the memory are arranged on the circuit board; the power supply circuit is configured to supply power to various circuits or components of the electronic device; the memory is configured to store executable program codes; and the processor is configured to read and execute the program codes stored in the memory to perform the following operations:

capturing a first (N=1) image of a parcel moving in a field of view;

identifying a barcode in the first image and acquiring information of the barcode in the first image, wherein the acquired information of the barcode in the first image comprises a position of the barcode relative to the image;

placing the information into a first queue;

for N=2 . . . M, with M being the number of the plurality of images, performing the following:

predicting a position that the barcode in the $(N-1)^{th}$ image would locate in an Nth image to be captured;

capturing the Nth image of the parcel moving in the field of view;

identifying a barcode in the Nth image and acquiring information of the barcode in the $N^{th}$ image determining whether the position of the barcode in the $N^{th}$ image matches the predicted position;

placing the information of the barcode in the $N^{th}$ image into the first queue if the positions match; and after the parcel leaves the field of view, selecting, according to the information of the barcode placed into the first queue, an image from said plurality of images as an optimal image.

11. A system for capturing and processing a plurality of images of a surface of a logistics parcel while the parcel moves through a field of view for image capture, comprising:

a conveyor and an electronic device of claim 10, wherein, the conveyor is used to convey a parcel;

the electronic device is configured to capture a plurality of images of the parcel placed on the conveyor as the parcel enters a field of view, and process the plurality of images as captured.

12. The electronic device of claim 10, wherein, a position of a barcode in an image comprises a position of a vertex of a polygon that circumscribes the barcode in the image;

wherein, determining whether the position of the barcode in the $N^{th}$ image matches with the predicted position comprises:
determining whether a distance between the position of the barcode in the $N^{th}$ image and the predicted position of the barcode satisfies a predetermined threshold requirement; and if so, determining that the position of the barcode in the $N^{th}$ image matches with the predicted position; and
wherein, the method further comprises: outputting the optimal image as selected.

13. The electronic device of claim 10, wherein selecting said optimal image comprises:
determining, after the parcel leaves the field of view, for each piece of information of the barcode placed in the first queue, a center of the position in said each piece of information;
selecting, as the optimal image, from said plurality of images:
an image of which the information of the barcode has been placed in the first queue and the center of which is closest to the center of the barcode or
an image of which the center of the barcode is closest to a center of a preset area.

14. The electronic device of claim 10, wherein, information of a barcode further comprises an identification result for the barcode;
the operations further comprise:
after the parcel leaves the field of view, classifying identification results for a barcode in said plurality of images into categories in terms of the number of characters contained in each of the identification results;
selecting, from the categories, a category that has the largest number of members; and
for the selected category, analyzing each of the identification results for the barcode bit by bit, and taking a character that appears with the highest frequency in each bit as an identification result for the bit, so as to obtain a final identification result for the barcode.

15. The electronic device of claim 14, wherein, the operations further comprise:
superimposing the final identification result for the barcode on the optimal image as selected.

16. The electronic device of claim 10, wherein, the operations further comprise:
placing, if the position of the barcode in the $N^{th}$ image does not match with the predicted position, the information of the barcode in the $N^{th}$ image into another queue.

17. The electronic device of claim 10, wherein the operations further comprise:
identifying one or more additional barcodes in each of said plurality of images and acquiring their respective information and placing the information of each of the barcodes into a respective queue different from the first queue.

18. The electronic device of claim 17, wherein the operations further comprise:
determining, for each of the additional barcodes in the $N^{th}$ image, whether a distance between a center of the position of said each barcode in the $N^{th}$ image and a center of the predicted position said each barcode would locate in the $N^{th}$ image satisfies a predetermined threshold requirement;
and placing the information of said each barcode into the respective queue for each said barcode if the distance satisfies the predetermined threshold requirement.

19. The electronic device of claim 17, wherein, after the parcel leaves the field of view, selecting, according to a preset optimal position of the barcode relative to an image and the information of the barcode placed into the queue, an optimal image from all images captured for the parcel comprises:
for each of said plurality of images,
acquiring, after the parcel leaves the field of view, a position of each barcode relative to the image from the respective queue for each said barcode, and
determining a common center for the plurality of barcodes in the image;
selecting, as the optimal image, from said plurality of images,
an image in which the common center for the plurality of barcodes is closest to the center of the image; or
an image in which the common center for the plurality of barcodes is closest to the center of a preset area.

20. A non-transitory storage medium, having executable program codes stored thereon which, when being executed, perform the method for processing a plurality of images of a surface of a logistics parcel of claim 1.

* * * * *

UNITED STATES PATENT AND TRADEMARK OFFICE
CERTIFICATE OF CORRECTION

PATENT NO. : 10,860,877 B2
APPLICATION NO. : 16/321959
DATED : December 8, 2020
INVENTOR(S) : Qiming Wan et al.

Page 1 of 1

It is certified that error appears in the above-identified patent and that said Letters Patent is hereby corrected as shown below:

In the Claims

Please delete "with" In Claim 6 (Column 21, Line 47).

Please delete "with" In Claim 16 (Column 24, Line 2).

Signed and Sealed this
Nineteenth Day of January, 2021

Andrei Iancu
*Director of the United States Patent and Trademark Office*